March 17, 1925.                                               1,530,017
K. SOULIOTIS
SPRING BUMPER FOR AUTOMOBILES
Filed Dec. 6, 1923
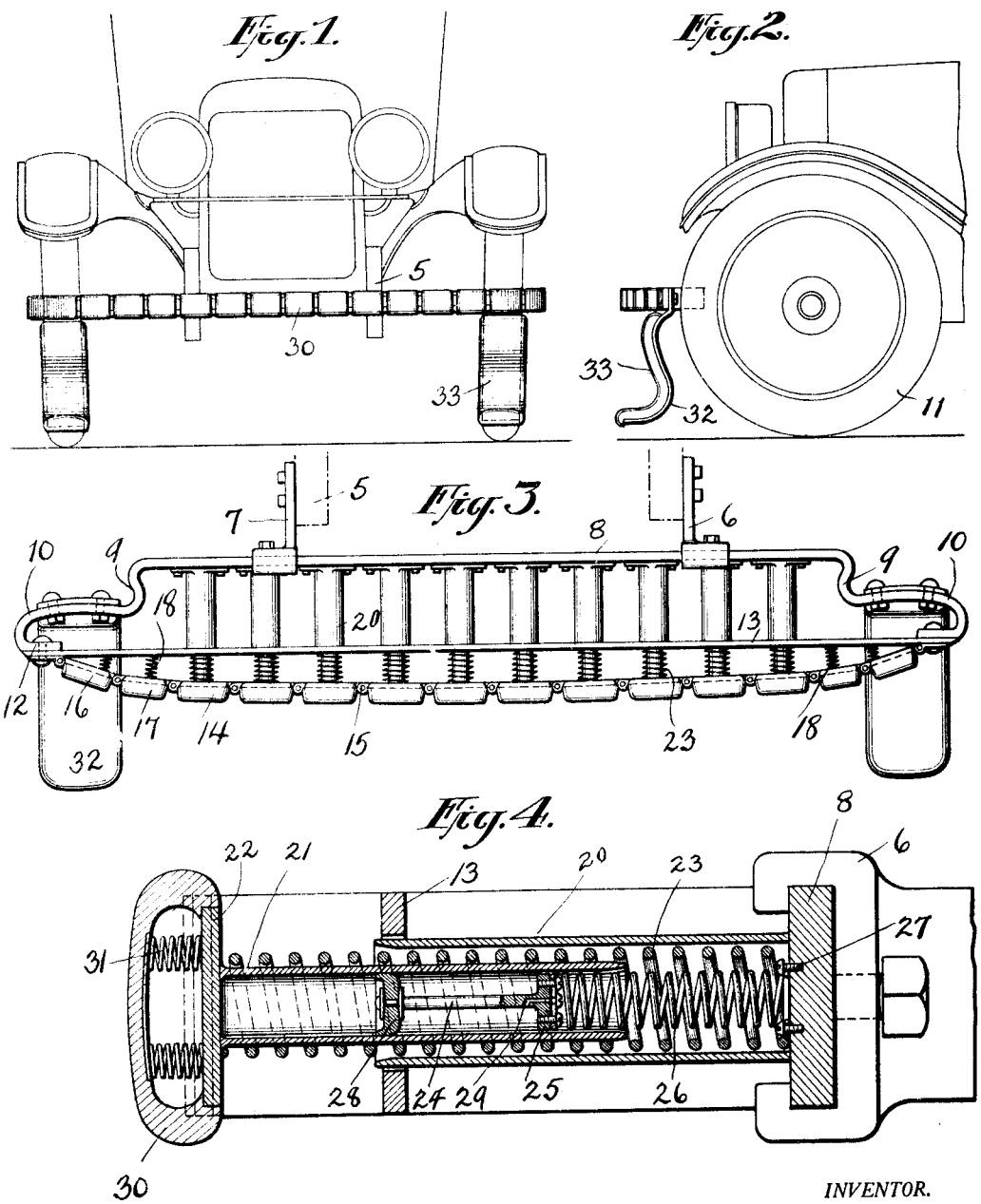
INVENTOR.
KYRIAKOS SOULIOTIS.
BY
ATTORNEY.

Patented Mar. 17, 1925.

1,530,017

UNITED STATES PATENT OFFICE.

KYRIAKOS SOULIOTIS, OF NEW YORK, N. Y.

SPRING BUMPER FOR AUTOMOBILES.

Application filed December 6, 1923. Serial No. 679,012.

*To all whom it may concern:*

Be it known that I, KYRIAKOS SOULIOTIS, a citizen of Greece, residing at New York city, in the county of New York and State of New York, have invented certain new and useful Improvements in Spring Bumpers for Automobiles, of which the following is a specification.

This invention relates to spring bumpers for motor vehicles and the like and more particularly to a novel and improved shock absorbing bumper particularly designed to prevent fatal injury to a pedestrian when struck.

One of the objects of my invention is the provision of a novel and improved automobile bumper of the type mounted at the front end of a machine including a plurality of connected, resilient, cushioning members or elements movable relatively to the frame of the bumper at any point throughout its length and thus reduce the possibility of fatal injury to a person or damage to an object when struck.

Another object of my invention is to provide a spring bumper with a plurality of inwardly and outwardly movable spring controlled and freely movable connected cushioning members including provision for protecting the front steering wheels and prevent accidents.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a front view showing the invention mounted on the motor vehicle.

Figure 2 is a side view.

Figure 3 is a plan.

Figure 4 is an enlarged, longitudinal section through one of the cushioning and shock absorbing members.

Referring now to the drawings, wherein like reference characters designate corresponding parts throughout all the views, 5 designates a portion of the motor vehicle frame to which is rigidly secured a pair of brackets 6, 7, for supporting the frame of the bumper. The bumper frame consists of a rear, horizontal flat bar 8, each end of which is bowed forwardly as at 9 and outwardly as at 10, being of a length to extend beyond the front wheels 11 of the vehicle. The ends of the bowed portion 10 are bent inwardly as indicated at 12 and have riveted thereto a flat horizontally extending, front guide bar 13, which is perforated at uniform distances throughout the major portion of its length for a purpose presently to appear.

Hingedly connected to each end of the guide bar 13, I have provided a plurality of connected, cushioning members 14, each of said members being, in turn, hingedly connected at 15 to the next adjacent cushioning member. The end cushioning members 16, 17, are spaced from the guide bar 13 by resilient springs 18 which permit of a cushioning effect at this end of the bar. Rigidly connected to the rear bar 8 between the forwardly bent portions 9, there is provided a plurality of equally spaced housings or casings 20, secured in any well known manner to the front face of the bar 8 as shown more clearly by Figure 3 of the drawings. Within the housing 20, there is provided an inwardly and outwardly movable cylinder 21, open at its inner end and formed with an enlarged head 22 at its outer end. A heavy coil spring 23 extending within the housing 20 and bearing against the bar 8, normally retains the head 22 beyond the guide bar 13 for some distance, it being observed that the housing 20, however, extends through the spaced recesses of the said bar 13 as shown by Figure 4 of the drawings. Within the cylinder 21 there is provided a spring controlled piston 24, the head 25 of which, is adapted to bear against a smaller coil spring 26, said last mentioned coil spring being secured at its opposite end to the screws or fastening elements 27 in the bar 8. The piston 24 is further provided with a plunger head 28 which frictionally engages the wall of the cylinder 21 and acts somewhat in the nature of a pneumatic pump upon each operation or inward movement of said cylinder against the resistance of the spring 26, it being noted that the head 25 is provided with an opening 29 for the admission of air.

The enlarged head 22 of the cylinder 21 is provided with a shock absorbing cushion 30 constructed of resilient material, being preferably hollow and provided with springs 31 which bear against the outer face of the head 22 above referred to. Connected to the outwardly bowed portions 10 of the bar 8, I have also provided a downwardly and forwardly sinuously curved fender 32 having a front pad or cushioning element 33 whereby one is prevented from being struck by the front wheels of the machine.

It will thus be seen from this construction that by reason of the hingedly connected cushioning members movable inwardly and outwardly with the cylinders 21 against the resistance of the coil spring 23, that a very effective shock absorber in the nature of a bumper is provided and that the provision of the piston bearing against the inner coil spring has the tendency to more quickly return the cushioning members 14 when struck to their initial positions.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. In an automobile fender, a frame, means for supporting the frame from the chassis of a motor vehicle, and a plurality of hingedly connected, resilient shock absorbing elements movable relatively to the frame upon impact.

2. In an automobile fender, a frame, a front guide bar secured to the frame, a plurality of spaced housings disposed between the frame and guide bar, a plurality of connected shock absorbing elements attached to the ends of the guide bar, certain of said elements extending within the housings and movable relative to the frame and bar upon impact.

3. In an automobile fender, a frame, a front guide bar secured to the ends of the frame, spaced housings between the frame and the guide bar, a plurality of connected cushioning elements attached to the ends of the guide bar, each of said cushioning elements having a cylinder extending within the housing, and a coiled spring within each of the said housings bearing against the cushioning element to absorb a shock upon impact.

4. In an automobile fender, a frame, a front guide bar secured to the ends of the frame, a plurality of connected cushioning elements attached to the ends of the guide bar, each of said cushioning elements comprising a cylinder having an enlarged head and adapted to extend through the guide bar, a housing for the cylinder, a coiled spring bearing against the frame and the head to normally maintain the cylinder retracted from the housing, and spring controlled plunger operating means within the cylinder to quickly return the same upon impact.

In testimony whereof I affix my signature.

KYRIAKOS SOULIOTIS. [L. S.]